United States Patent
Groarke (10) Patent No.: US 11,966,889 B2
(45) Date of Patent: Apr. 23, 2024

(54) METHOD AND SYSTEM FOR DISPUTE RESOLUTION IN A PUBLIC BLOCKCHAIN

(71) Applicant: Mastercard International Incorporated, Purchase, NY (US)

(72) Inventor: Peter Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/112,111

(22) Filed: Feb. 21, 2023

(65) Prior Publication Data

US 2023/0196312 A1 Jun. 22, 2023

Related U.S. Application Data

(63) Continuation of application No. 17/474,462, filed on Sep. 14, 2021, now Pat. No. 11,599,859, which is a
(Continued)

(51) Int. Cl.
*G06Q 20/00* (2012.01)
*G06Q 20/06* (2012.01)
(Continued)

(52) U.S. Cl.
CPC ..... *G06Q 20/0658* (2013.01); *G06Q 20/3825* (2013.01); *G06Q 20/3829* (2013.01);
(Continued)

(58) Field of Classification Search
CPC ........... G06Q 20/0658; G06Q 20/3825; G06Q 20/3829; G06Q 2220/00; G06Q 20/065;
(Continued)

(56) References Cited

U.S. PATENT DOCUMENTS

| 2016/0071096 A1* | 3/2016 | Rosca ................... G06Q 20/36 705/67 |
| 2017/0046693 A1 | 2/2017 | Haldenby et al. |

(Continued)

FOREIGN PATENT DOCUMENTS

| JP | 2015535365 A | 12/2015 |
| JP | 2017515252 A | 6/2017 |

OTHER PUBLICATIONS

Notification of Transmittal of the International Search Report (Forms/ISA/220 and PCT/ISA/210) and the Written Opinion of the International Searching Authority (Form PCT/ISA/237) dated Jan. 3, 2020, by the International Application Diviosion Korean Intellectual Property Office in corresponding International Application No. PCT/US2019/051844 (10 pages).
(Continued)

*Primary Examiner* — Dante Ravetti
(74) *Attorney, Agent, or Firm* — Panitch Schwarze Belisario & Nadel LLP (57) ABSTRACT

A method for dispute resolution for a blockchain transaction includes: receiving, by a receiver of a processing server, a blockchain transaction identifier and a dispute reason code from a first computing device of a blockchain network, the blockchain transaction identifier and the dispute reason code comprising a dispute request, the blockchain transaction identifier identifying a transaction on a blockchain; transmitting, by the receiver of a processing server, the blockchain transaction identifier and the dispute reason code to a processing device of the processing server; identifying, by the processing device of the processing server, the transaction, a merchant blockchain address, and a currency amount within a blockchain data value of the blockchain based on the blockchain transaction identifier; determining, by the processing device of the processing server, the transaction is
(Continued)

invalid; and performing, by the processing device of the processing server, a dispute resolution process for the blockchain transaction.

20 Claims, 5 Drawing Sheets

Related U.S. Application Data continuation of application No. 16/142,216, filed on Sep. 26, 2018, now Pat. No. 11,138,572.

(51) Int. Cl.
*G06Q 20/38* (2012.01)
*H04L 9/30* (2006.01)
*H04L 9/32* (2006.01)
*H04L 9/00* (2022.01)

(52) U.S. Cl.
CPC .............. *H04L 9/30* (2013.01); *H04L 9/3247* (2013.01); *G06Q 2220/00* (2013.01); *H04L 9/50* (2022.05); *H04L 2209/56* (2013.01)

(58) Field of Classification Search
CPC ........ G06Q 20/02; G06Q 20/389; H04L 9/30; H04L 9/3247; H04L 9/50; H04L 2209/56; H04L 63/126; H04L 9/3239
USPC ................. 705/16, 21, 59; 380/44, 262, 278
See application file for complete search history.

(56) References Cited

U.S. PATENT DOCUMENTS

| | | |
|---|---|---|
| 2017/0109734 A1 | 4/2017 | Kote |
| 2017/0187535 A1 | 6/2017 | Middleton et al. |
| 2017/0372308 A1 | 12/2017 | Metnick et al. |
| 2018/0268382 A1 | 9/2018 | Wasserman |

OTHER PUBLICATIONS

First Examination Report dated Oct. 20, 2022, by the Indian Patent Office in corresponding Indian Patent Application No. 202117011847 and an English Translation of the Office Action. (7 pages).

Second Office Action dated Feb. 21, 2023, by the Japanese Patent Office in corresponding Japanese Patent Application No. 2021-516754 and an English Translation of the Office Action. (6 pages).

* cited by examiner

METHOD AND SYSTEM FOR DISPUTE RESOLUTION IN A PUBLIC BLOCKCHAIN

FIELD

The present disclosure relates to dispute resolution for blockchain transactions, specifically the use of a dispute resolution process between a merchant and consumer that results in a new blockchain transaction that effects a reversal of the disputed blockchain transaction.

BACKGROUND

Blockchains were created as an alternative to standard fiat transactions that provide consumers with greater anonymity and strong protections against fraud and theft. However, one of the benefits of a blockchain that makes it operate with a high level of security, its immutability, also leads to a potential problem: transactions cannot be reversed. In a traditional payment transaction that is processed by a payment network, a transaction can be reversed through a well-defined chargeback process that has been used for decades, where a processed transaction is reversed and the money returned to the purchaser's transaction account. To strengthen this process, payment networks often offer additional services to merchants and consumers regarding reversals, such as accepting evidence from both sides to make a determination and the tracking of chargebacks made against a merchant and increasing processing fees for merchants that experienced increased chargebacks to provide motivation for more trustworthy transactions.

In a blockchain, data for processed transactions cannot be modified. In addition, there is no mechanism to force any party to perform a payment transaction. As a result, there is no current solution available to provide chargebacks for blockchain transactions. Thus, there is a need for a technological improvement to blockchain systems to enable chargebacks to be issued for blockchain transactions, which provides consumers with the same protections afforded in traditional payment transaction systems.

SUMMARY

The present disclosure provides a description of systems and methods for dispute resolution of a blockchain transaction. A third party system, operating similar to a payment network in a traditional, fiat payment transaction, performs a dispute resolution process between a consumer and a merchant involved in a blockchain transaction. As part of the dispute resolution process, the third party holds the ability to force payment from the merchant to the consumer, such as by receiving a digital signature from the merchant or using a smart contract that operates on the basis of the result of the dispute resolution process. In some cases, the third party may utilize rules for dispute resolution used in traditional payment transactions, which may also include taking into account merchant performance in traditional transactions for a merchant involved in a disputed blockchain transaction. As a result, a merchant can be punished in their fiat or blockchain transactions for transactions charged back using either type of currency, providing greater incentive for merchants to conduct trustworthy transactions and resolve disputes amicably with consumers.

A method for dispute resolution for a blockchain transaction includes: receiving, by a receiver of a processing server, a blockchain transaction identifier and a dispute reason code from a first computing device of a blockchain network, the blockchain transaction identifier and the dispute reason code comprising a dispute request, the blockchain transaction identifier identifying a transaction on a blockchain; transmitting, by the receiver of a processing server, the blockchain transaction identifier and the dispute reason code to a processing device of the processing server; identifying, by the processing device of the processing server, the transaction, a merchant blockchain address, and a currency amount within a blockchain data value of the blockchain based on the blockchain transaction identifier; determining, by the processing device of the processing server, the transaction is invalid; and performing, by the processing device of the processing server, a dispute resolution process for the blockchain transaction, wherein the dispute resolution process includes: receiving, by the receiver of the processing server, a merchant digital signature from a second computing device of the blockchain network; transmitting, by the processing device of the processing server, the merchant digital signature and the currency amount to the transmitter of the processing server; receiving, by the transmitter of the processing device, the merchant digital signature and the currency amount; and transmitting, by a transmitter of the processing server, at least the merchant digital signature and the currency amount to a node in the blockchain network.

A system for dispute resolution for a blockchain transaction including: a processing server, the processing server comprising a processing device, a receiver, a transmitter, and a memory storing instructions that when executed by the processor, cause the processor to perform the steps of: receiving, by a receiver of a processing server, a blockchain transaction identifier and a dispute reason code from a first computing device of a blockchain network, the blockchain transaction identifier and the dispute reason code comprising a dispute request, the blockchain transaction identifier identifying a transaction on a blockchain; transmitting, by the receiver of a processing server, the blockchain transaction identifier and the dispute reason code to a processing device of the processing server; identifying, by the processing device of the processing server, the transaction, a merchant blockchain address, and a currency amount within a blockchain data value of the blockchain based on the blockchain transaction identifier; determining, by the processing device of the processing server, the transaction is invalid; and performing, by the processing device of the processing server, a dispute resolution process for the blockchain transaction, wherein the dispute resolution process includes: receiving, by the receiver of the processing server, a merchant digital signature from a second computing device of the blockchain network; transmitting, by the processing device of the processing server, the merchant digital signature and the currency amount to the transmitter of the processing server; receiving, by the transmitter of the processing device, the merchant digital signature and the currency amount; and transmitting, by a transmitter of the processing server, at least the merchant digital signature and the currency amount to a node in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Dispute Resolution of Blockchain Transactions

Figure 1:
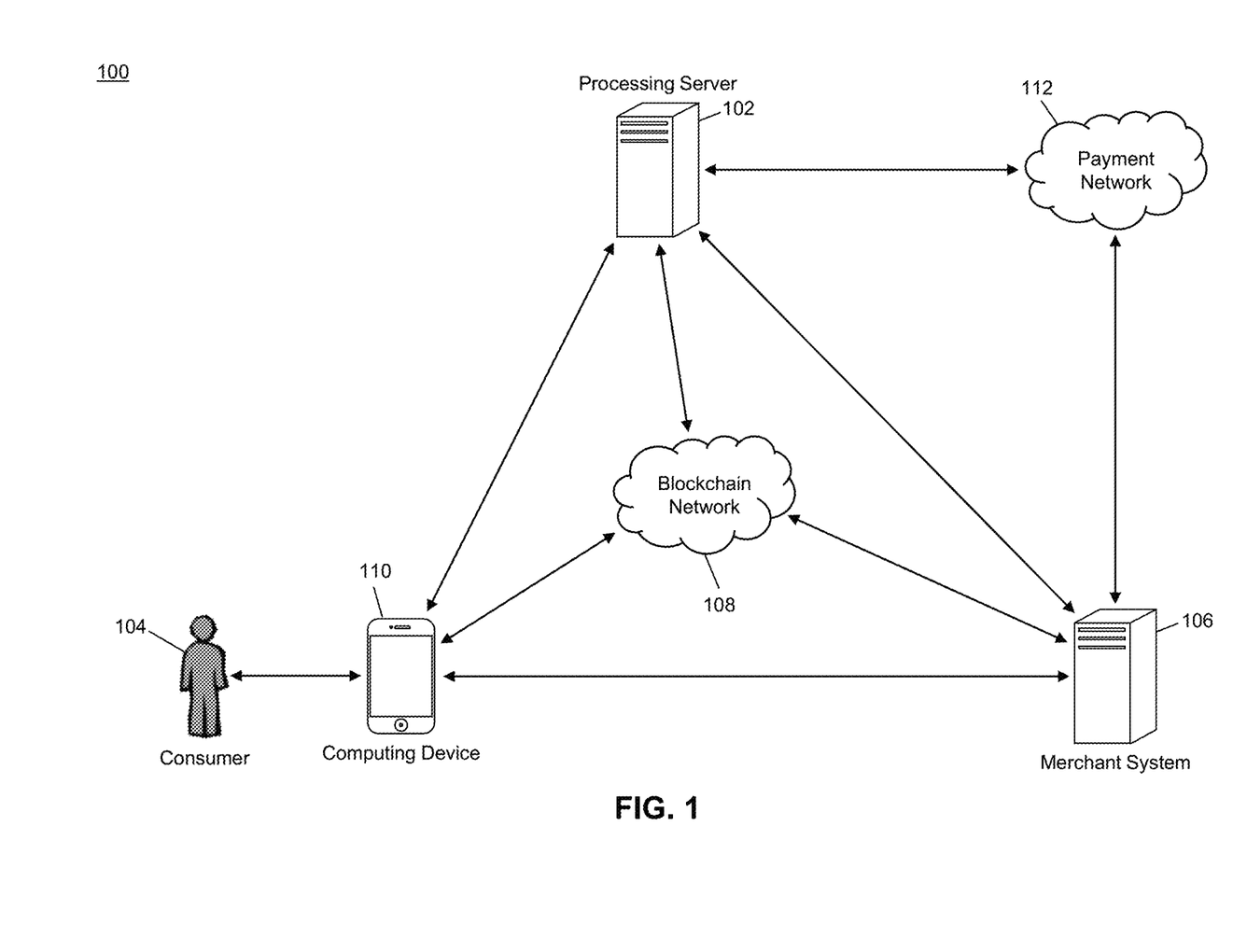
FIG. 1 is a block diagram illustrating a high level system architecture for dispute resolution for blockchain transactions in accordance with exemplary embodiments.

FIG. 1 illustrates a system 100 for the performing of dispute resolution for a blockchain transaction conducted between a consumer and a merchant, where traditional chargeback rules and remedies can be applied to a blockchain transaction and a new blockchain transaction conducted to affect a chargeback of a disputed blockchain transaction.

The system 100 may include a processing server 102. The processing server 102, discussed in more detail below, may be configured to perform dispute resolution between a consumer 104 and a merchant system 106 that are involved in a blockchain transaction. A blockchain transaction may be conducted between the consumer 104 and the merchant system 106 using a blockchain wallet associated with each of the entities involved in the payment transaction. A blockchain wallet may be an application program that is executed by a computing device possessed by the respective entity, such as a computing device 110 possessed by the consumer 104 or a computing device of the merchant system 106. A blockchain wallet may include a private key of a cryptographic key pair that is used to generate digital signatures that serve as authorization by the respective entity for a blockchain transaction, where the digital signature can be verified using the public key of the cryptographic key pair. In some cases, the term "blockchain wallet" may refer specifically to the private key. In some embodiments, the private key may be stored on the computing device 110. In other embodiments, the private key may be stored by a third party, such as a key repository that may operate similar to an issuing financial institution for a traditional transaction account. The computing device 110 may be any type of device suitable for performing the functions discussed herein, such as a desktop computer, laptop computer, tablet computer, notebook computer, cellular phone, smart phone, smart watch, smart television, wearable computing device, implantable computing device, etc.

Blockchain transactions may be processed by a node in a blockchain network 108 that is associated with the blockchain. The blockchain network 108 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 108 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to a blockchain transaction. A blockchain transaction may consist of at least: a digital signature of the sender of currency (e.g., the consumer 104) that is generated using the sender's private key, a blockchain address of the recipient of currency (e.g., the merchant system 106) generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. In some cases, a blockchain transaction may also include the sender's public key, for use by any entity in validating the transaction.

For the processing of a blockchain transaction, such data may be provided to a node in the blockchain network 108, either by the sender (e.g., via the computing device 110) or the recipient (e.g., by the merchant system 106). The node may verify the digital signature and the sender's access to the funds, and then include the blockchain transaction in a new block. The new block may be validated by other nodes in the blockchain network 108 before being added to the blockchain and distributed to all of the nodes in the blockchain network 108.

In a standard blockchain transaction, the consumer 104 may thus generate a digital signature using the computing device 110 using the private key thereof. The merchant system 106 may generate a blockchain address using its public key, which may be provided to the computing device 110. In some cases, the merchant system 106 may provide the computing device 110 with its public key, where the computing device 110 may generate the blockchain address. The computing device 110 may then submit the required information to a node in the blockchain network 108 for processing. In some instances, the node may return a blockchain transaction identifier to the computing device 110, which may be a value that is unique to that blockchain transaction for identification thereof. In such traditional transactions, the merchant system 106 is required to generate blockchain address or distribute its public key, and, in some cases, may be required to submit the transaction data directly to the blockchain network 108.

In the system 100, the processing server 102 may be configured to assist in the resolution of a dispute of a blockchain transaction involving the consumer 104 and the merchant system 106. In such instances, the consumer 104 may have a desire to reverse a blockchain transaction conducted with the merchant system 106. In some cases, the merchant system 106 may refuse to provide a refund to the consumer 104, requiring the consumer 104 to institute a reversal, known in traditional payment transactions as a chargeback. The consumer 104 may submit a chargeback request to the processing server 102 for the blockchain transaction, which may refer to the blockchain transaction for which chargeback is requested, such as through the unique identifier assigned to the blockchain transaction or other identifying information, such as the blockchain addresses used in the transaction for the sending and/or receipt of currency. The request may be submitted to the processing server 102 by the computing device 110 using any suitable method, such as an application program, web interface, e-mail, short messaging service message, etc.

The processing server 102 may contact the merchant system 106 and perform a dispute resolution process between the consumer 104 and the merchant system 106. The dispute resolution process may include the gathering of evidence from the consumer 104 and/or merchant system 106 to be used in determining whether or not the requested chargeback should be honored or refused. In some cases, the type of evidence gathered and the determination may be based on a reason provided by the consumer 104 for the chargeback. For instance, the processing server 102 may use chargeback rules that are also used in chargebacks for traditional, fiat currency payment transactions, where a chargeback can be requested when the merchant 106 failed to provide purchased goods or services, the merchant system 106 failed to cancel a recurring transaction when requested, the wrong product was provided to the consumer 104, a defective product was provided to the consumer 104, the transaction was conducted by a fraudster, etc. As an example, the evidence requested as part of the dispute resolution for a fraudulent transaction may vary from the evidence requested as part of the dispute resolution for a transaction where the delivered product is alleged to be defective. Evidence used for a dispute resolution process for a chargeback will be apparent to persons having skill in the relevant art.

In some embodiments, the processing server 102 may require the consumer 104 to provide proof of ownership of a transaction that is being disputed. In such embodiments, the consumer 104 may be required to provide a digital signature to prove ownership of the electronic wallet used in the disputed blockchain transaction. The digital signature may be provided in the chargeback request or subsequent to the chargeback request, where the processing server 102 may validate the digital signature using a public key of the consumer's cryptographic key pair, which may be stored in the blockchain data value for the disputed transaction. Successful validation of the digital signature may indicate that the consumer 104 is the same consumer involved in the disputed transaction or is otherwise authorized by the consumer involved in the disputed transaction to resolve the dispute. In some cases, the processing server 102 may also require the merchant system 106 to provide a digital signature for proof as well, which may be validated using the public key used to generate the blockchain address used by the merchant system 106 to receive the funds in the disputed blockchain transaction.

The processing server 102 may perform the dispute resolution process, which may result in making a decision regarding whether or not to reverse the blockchain transaction, thereby ruling in favor of the consumer 104. In some cases, the processing server 102 may use the same chargeback rules that are used in a traditional fiat currency transaction conducted using a traditional payment network 112. In such cases, the consumer 104 and merchant system 106 may be familiar with the rules regarding resolution of the dispute, which may also take into account past performance of the consumer 104 and/or merchant system 106 in traditional payment transactions (e.g., where each identity may be proven using traditional methods associated therewith, such as having the respective entity provide a payment card or other proof of access to a transaction account). Chargeback rules may specify which party the burden rests on to prove their case, the type of evidence requested depending on the reason for the chargeback, how rules are made on the evidence, etc. For instance, if the chargeback is requested for a defective product, the consumer 104 may be required to provide evidence illustrating the defect. In another example, if the chargeback is requested for non-delivery of a product or service, the merchant system 106 may be required to provide proof that the product or service was successfully delivered to the consumer 104.

Once the dispute is resolved, the processing server 102 may enforce resolution accordingly. In cases where the consumer 104 is ruled against, no additional actions may be performed as the blockchain transaction may stand. In some cases, the processing server 102 may establish a record for the consumer 104 regarding their requested chargebacks, where failed chargebacks may increase the burden on the consumer 104 for future chargeback requests. In cases where the resolution is decided in favor of the consumer 104, a new blockchain transaction may be initiated that would result in a return of payment from the merchant system 106 to the consumer 104 that is equivalent to the disputed blockchain transaction. As the existing data in a blockchain is immutable, a reversal is not directly made, but rather a new blockchain transaction that is the opposite (e.g., sender and recipient are switched but the transaction amount kept the same) is initiated.

In some embodiments, the processing server 102 may wait until the dispute is resolved before performing any actions with respect to the new blockchain transaction. In other embodiments, the processing server 102 may utilize a smart contract that is created on the blockchain when the chargeback request is first submitted. A smart contract is a self-executable script that is stored in the blockchain that is configured to perform or not perform a transaction based on supplied data. In the system 100, a smart contract may be created that is configured to initiate a blockchain transaction for payment from the merchant system 106 to the consumer 104 for the same amount as the disputed blockchain transaction if the dispute resolution is ruled in favor of the consumer 104. In some cases, the smart contract may initiate a first blockchain transaction when created that will hold the disputed amount in escrow (e.g., in a holding blockchain wallet, which may be operated by the processing server 102 or an additional third party entity). In such cases, if the dispute resolution is ruled in favor of the consumer 104, a second blockchain transaction may be initiated that will forward the amount to the consumer 104, whereas, if the dispute resolution is ruled in favor of the merchant system 106, the second blockchain transaction that is initiated may forward the amount back to the merchant system 106.

Regardless of implementation, as part of the new blockchain transaction, the merchant system 106 may be required to provide a digital signature generated using the private key of the merchant's blockchain wallet, and the consumer 104 may be required to provide a blockchain address generated using the public key of the consumer's blockchain wallet. The digital signature and blockchain address may be included in the new blockchain transaction that is submitted to the blockchain network 108, which may enable proper processing of the new blockchain transaction. The result is a new blockchain transaction that provides payment of the disputed amount from the merchant system's blockchain wallet back to the consumer's blockchain wallet, resulting in a "reversal" of the initial blockchain transaction, but without requiring modification to the blockchain thus retaining its immutability.

In some embodiments, the processing server 102 may be configured to maintain a database regarding chargebacks made against a merchant system 106. In such embodiments, repeated chargebacks may have a negative effect on the merchant system 106, such as in future dispute resolution involving the merchant system 106 or in the charging of fees for transactions involving the merchant system 106. In some cases, transactions processed via a payment network 112 involving the merchant system 106 may be affected by chargebacks made on blockchain transactions. For instance, a single database may be used for chargebacks for merchant systems 106 for both fiat and blockchain currency transactions, where chargebacks in either medium may be detrimental to the merchant system 106. In cases where blockchain transactions may have fees associated therewith (e.g., mining fees), the fees may be affected by chargebacks made (e.g., for blockchain transactions, fiat currency transactions, or both) against the merchant system 106. In some embodiments, the processing server 102 may be a node in the blockchain network 108 and may implement the fees accordingly. In some cases, the processing server 102 may be a part of the payment network 112 and implement the fees for fiat currency transactions accordingly. In some instances, the processing server 102 may be a part of the payment network 112 as well as a node in the blockchain network 108.

In some embodiments, the processing server 102 may be configured to perform chargebacks or otherwise provide recourse to a consumer 104 in cases where the merchant system 106 may be unable to transact with the consumer 104. For instance, if the merchant goes bankrupt or is otherwise insolvent, the processing server 102 could assist in providing redress to the consumer 104. In some instances, bankruptcy insurance could be provided or made available by the processing server 102 (e.g., directly or through a third party) to assist consumers 104 in such instances.

The result is a method and system where chargebacks can be made on blockchain transactions, resulting in a reversal of a disputed blockchain transaction while maintaining the blockchain and all of its immutability. In cases where established chargeback rules and dispute resolution processes related to fiat currency transactions are used, dispute resolution and chargeback enforcement can utilize information for both fiat and blockchain currency transactions, increasing accuracy in dispute resolution and providing greater incentive for merchant participation. In addition, the tracking of chargebacks made against a merchant system 106 in both mediums can provide an even stronger deterrent to merchants from engaging in fraud or otherwise providing inadequate service to consumers 104. As a result, the methods and systems discussed herein provide not only the ability for a blockchain transaction to be reversed, but also improve the strength of the dispute resolution process for such transactions as well as for transactions involving fiat currency.

Processing Server

Figure 2:
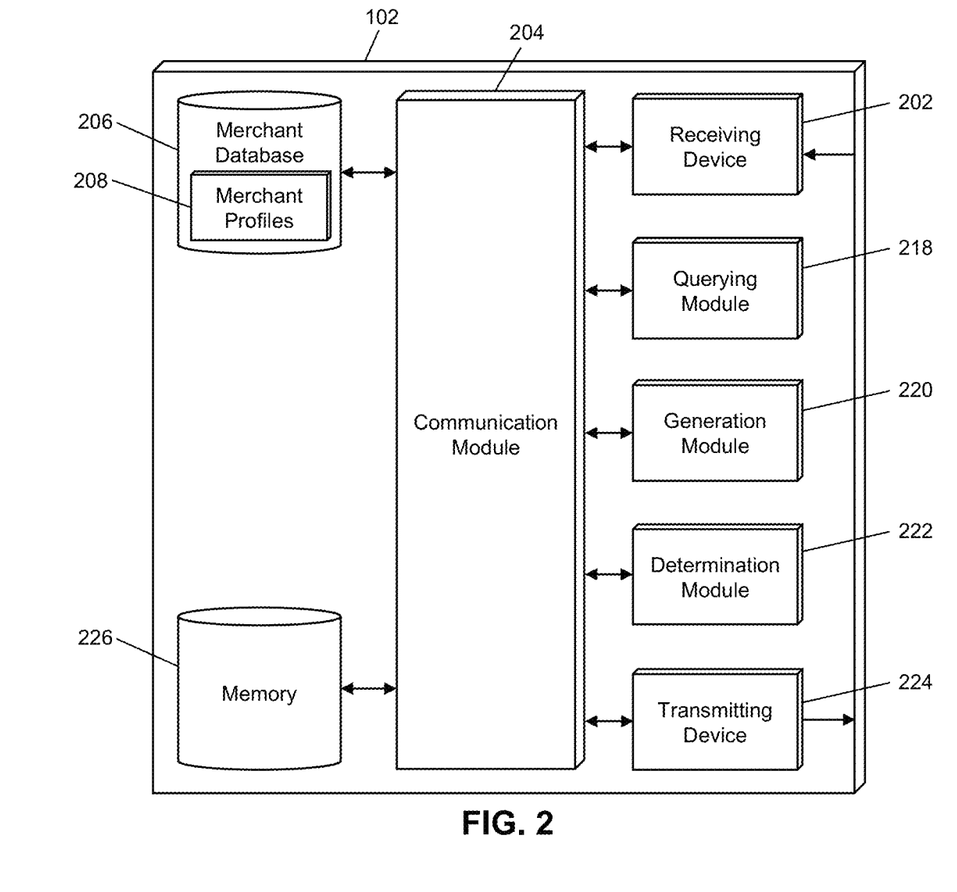
FIG. 2 is a block diagram illustrating the processing server of the system of FIG. 1 for dispute resolution of a blockchain transaction in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from merchant systems 106, blockchain networks 108, computing devices 110, payment networks 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by merchant systems 106 that may be superimposed or otherwise encoded with a public key associated with the merchant system's blockchain wallet, for use in generating blockchain addresses and for validating digital signatures, which may also be transmitted by the merchant system 106. Electronic transmissions from merchant systems 106 may also include evidence received as part of a dispute resolution process. The receiving device 202 may also be configured to receive data signals electronically transmitted by blockchain networks 108, which may be superimposed or otherwise encoded with blockchain data values, and may also be encoded with new blocks for validation an addition to a blockchain in embodiments where the processing server 102 may operate as a node. The receiving device 202 may be further configured to receive data signals electronically transmitted by computing devices 110, which may be superimposed or otherwise encoded with a chargeback request, which may include information identifying a disputed blockchain transaction, a digital signature generated by the consumer's private key, and evidence regarding resolution of the disputed blockchain transaction. The receiving device 202 may also be configured to receive data signals electronically transmitted by payment networks 112, which may be superimposed or otherwise encoded with transaction messages for payment transactions, chargeback rules, or other data regarding chargebacks involving a merchant. Transaction messages may be specially formatted data message that are formatted according to one or more standards governing the interchange of financial transaction messages, such as the International Organization of Standardization's ISO 8583 or ISO 20022 standards.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, determination module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a merchant database 206. The merchant database 206 may be configured to store a plurality of merchant profiles 208 using a suitable data storage format and schema. The merchant database 206 may be a relational database that utilizes structured query language for the storage, identification, modifying, updating, accessing, etc. of structured data sets stored therein. Each merchant profile 208 may be a structured data set configured to store data related to a merchant system 106. Each merchant profile 208 may include data related to the merchant include chargeback history, resolution evidence received from the merchant, a public key associated with the merchant's blockchain wallet, etc. In some cases, merchant profiles 208 may also be stored for each consumer 104 that has participated in a dispute resolution with the processing server 102.

The processing server 102 may include a querying module 218. The querying module 218 may be configured to execute queries on databases to identify information. The querying module 218 may receive one or more data values or query strings, and may execute a query string based thereon on an indicated database, such as the merchant database 206, to identify information stored therein. The querying module 218 may then output the identified information to an appropriate engine or module of the processing server 102 as necessary. The querying module 218 may, for example, execute a query on the merchant database 206 to identify a public key of the merchant for validating a digital signature, and for taking into account prior chargeback history when performing a dispute resolution involving the related merchant system 106 or for determining fees in a new transaction involving the related merchant system 106.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate notifications and other data messages for transmission to computing devices 110, such as prompts for digital signatures, dispute resolution evidence, etc., as well as for transmission to nodes in the blockchain network 108, such as for a new blockchain transaction to be processed. The generation module 220 may also be configured to generate digital signatures and blockchain addresses using private and public keys, respectively, using suitable algorithms. In some cases, the generation module 220 may also be configured to verify digital signatures using algorithms used in the generation of digital signatures, using a public key of a cryptographic key pair that includes the private key used to generate the digital signature. The generation module 220 may also be configured to generate data requests for submission to merchant systems 106, which may request evidence needed when performing a dispute resolution.

The processing server 102 may also include a determination module 222. The determination module 222 may be configured to make determinations for the processing server 102 as part of the methods and systems discussed herein. The determination module 222 may receive instructions as input, may make a determination as instructed, and may output a result of the determination to another module or engine of the processing server 102. In some embodiments, the input may include the data to be used in making the determination. In other embodiments, the determination module 222 may identify such data (e.g., by providing instructions to the querying module 218). The determination module 222 may, for example, determine whether to rule in favor of or against a consumer 104 in a dispute resolution for a disputed blockchain transaction. The determination may be based on evidence supplied by the merchant system 106 and/or consumer 104 as well as the disputed blockchain transaction, and reason requested for the chargeback.

The processing server 102 may also include a transmitting device 224. The transmitting device 224 may be configured to transmit data over one or more networks via one or more network protocols. In some instances, the transmitting device 224 may be configured to transmit data to merchant systems 106, blockchain networks 108, computing devices 110, payment networks 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to merchant systems 106 that are superimposed or otherwise encoded with data requests for dispute resolution evidence, requests for digital signatures and/or public keys, and information regarding awarded chargebacks. The transmitting device 224 may also be configured to electronically transmit data signals to nodes in blockchain networks 108, which may be superimposed or otherwise encoded with new blockchain transaction data values, smart contracts, or requests for blockchain data, such as may include identifying information such as a unique identifier. The transmitting device 224 may be further configured to electronically transmit data signals to computing devices 110, which may be superimposed or otherwise encoded with data requests for dispute resolution evidence, requests for digital signatures and/or public keys, and information regarding awarded chargebacks. The transmitting device 224 may also be configured to electronically transmit data signals to payment networks 112, which may be superimposed or otherwise encoded with requests for chargeback rules, data regarding awarded chargebacks, requests for data for use in dispute resolution, etc.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for computing devices 110, routing information for transaction messages, transaction message formatting standards, currency exchange rate data and algorithms, etc. In some embodiments, the memory 226 may also be configured to store chargeback rules, evidence requirements for dispute resolution, dispute resolution algorithms, etc.

Process for Dispute Resolution of Blockchain Transactions

Figure 3:
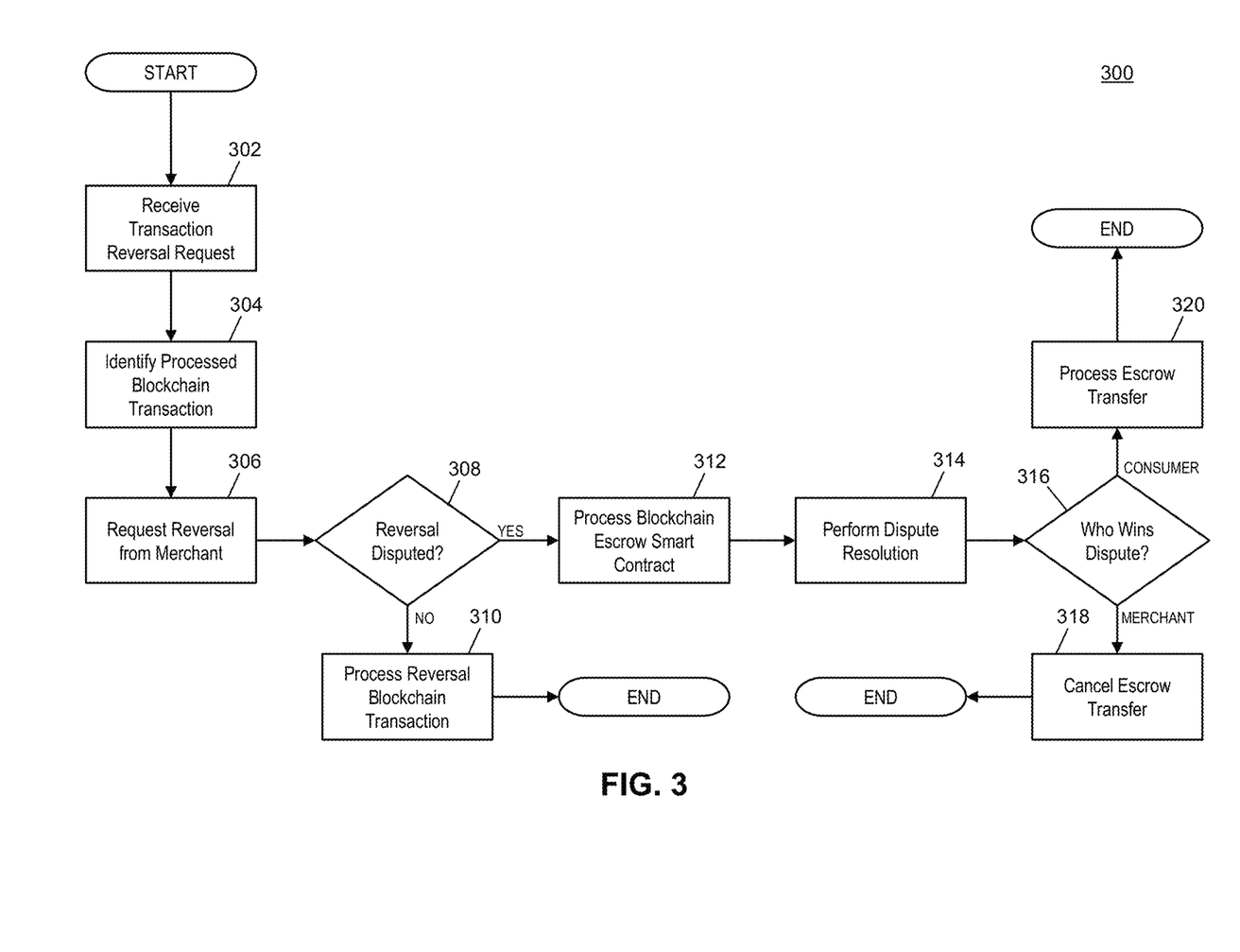
FIG. 3 is a flow diagram illustrating a process for resolving a dispute for a blockchain transaction executed by the processing server of FIG. 2 in accordance with exemplary embodiments.

FIG. 3 illustrates an example process 300 for the resolution of a dispute for a blockchain transaction involving the consumer 104 and merchant system 106 in the system 100 as executed by the processing server 102 of FIG. 2.

In step 302, the receiving device 202 of the processing server 102 may receive a request for a reversal of a blockchain transaction from the computing device 110. The request may include information identifying the blockchain transaction that is being disputed, a reason for the reversal, as well as a digital signature generated from the consumer's blockchain wallet used to prove ownership of the disputed transaction. In step 304, the querying module 218 of the processing server 102 may execute a query to identify the disputed blockchain transaction using the identifying information included in the request. In cases where a digital signature was provided by the consumer 104, step 304 may also include validating the digital signature using a public key included in the identified blockchain transaction.

In step 306, the transmitting device 224 of the processing server 102 may electronically transmit a request to the merchant system 106 using a suitable communication network and method requesting that the disputed blockchain transaction be reversed by the merchant system 106. The request may identify the blockchain transaction as well as include the reason for reversal and any evidence that may have been provided by the consumer 104 in the initial request. The merchant system 106 may determine whether or not they will honor the reversal and provide information back to the processing server 102. In step 308, the processing server 102 may determine if the reversal of the blockchain transaction is disputed by the merchant system 106. If there is no dispute, the merchant system 106 may provide the processing server 102 with a digital signature for its blockchain wallet. In step 310, the transmitting device 224 of the processing server 102 may electronically transmit a data message to a node in the blockchain network 108 that includes the merchant's digital signature, a blockchain address for the consumer 104 (e.g., generated using the consumer's public key), and the same transaction amount included in the disputed blockchain transaction. The node may then process the blockchain transaction resulting in the reversal.

If, in step 308, the processing server 102 determines that the merchant system 106 has disputed the reversal, then, in step 312, the generation module 220 of the processing server 102 may generate a smart contract that is submitted (e.g., by the transmitting device 224) to the blockchain network 108 to establish an escrow to hold the disputed blockchain amount. In step 314, the processing server 102 may perform a dispute resolution process between the consumer 104 and merchant system 106, which may include the exchange of evidence and a final determination (e.g., by the determination module 222) that may be based on the reason the chargeback was requested as well as the evidence provided by the entities. In step 316, the determination module 222 may provide its determination as to who wins the dispute. If the merchant system 106 wins the dispute, then, in step 318, the transfer of currency in the smart contract may be cancelled and the escrow released back to the merchant system 106. If the consumer 104 wins the dispute, then, in step 320, the smart contract may trigger the initiation of a new blockchain transaction for payment of the disputed amount from the merchant system 106 to the consumer 104, such as by submitted (e.g., by the transmitting device 224) a new blockchain transaction to a node in the blockchain network 108 for the disputed amount that also includes the merchant's digital signature and a blockchain address for the consumer 104.

Exemplary Method for Dispute Resolution for a Blockchain Transaction

Figure 4:
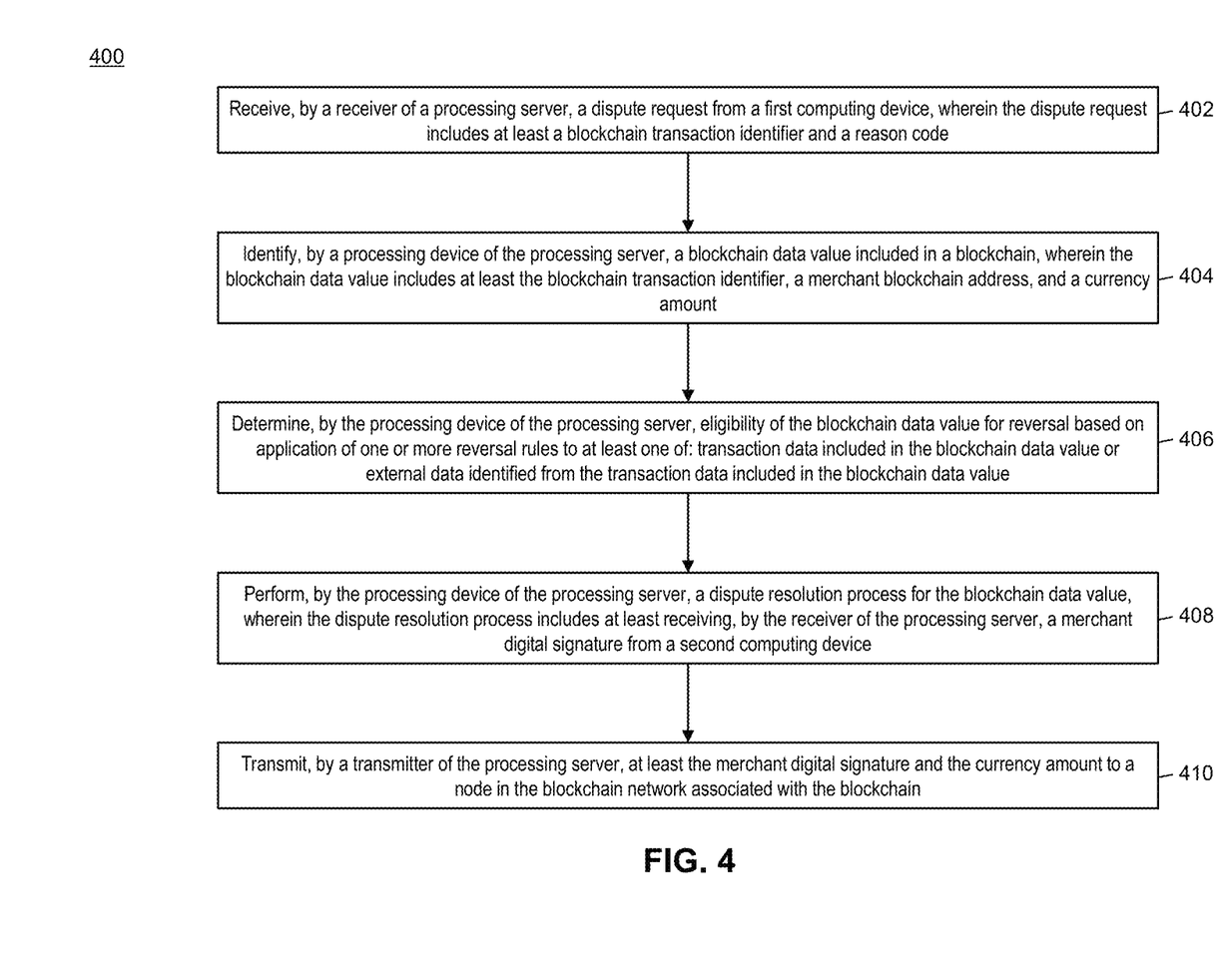
FIG. 4 is a flow chart illustrating an exemplary method for dispute resolution for a blockchain transaction in accordance with exemplary embodiments.

FIG. 4 illustrates a method 400 for the conducting of a dispute resolution process involving two entities involved in a blockchain transaction that can facilitate a reversal of a blockchain transaction without modification to the existing blockchain.

In step 402, a dispute request may be received by a receiver (e.g., the receiving device 202) of a processing server (e.g., the processing server 102) from a first computing device (e.g., the computing device 110), wherein the dispute request includes at least a blockchain transaction identifier and a reason code. In step 404, a blockchain data value included in a blockchain may be identified by a processing device of the processing server, wherein the blockchain data value includes at least the blockchain transaction identifier, a merchant blockchain address, and a currency amount.

In step 406, eligibility of the blockchain data value for reversal may be determined by the processing device of the processing server based on application of one or more reversal rules to at least one of: transaction data included in the blockchain data value or external data identified from the transaction data included in the blockchain data value. In step 408, a dispute resolution process may be performed for the blockchain data value by the processing device of the processing server, wherein the dispute resolution process includes at least receiving, by the receiver of the processing server, a merchant digital signature from a second computing device (e.g., the merchant system 106). In step 410, at least the merchant digital signature and the currency amount may be transmitted by a transmitter (e.g., the transmitting device 224) of the processing server to a node in the blockchain network (e.g., the blockchain network 108) associated with the blockchain.

In one embodiment, the dispute request may further include a consumer digital signature, the blockchain data value may further include a consumer public key, and the method 400 may also include verifying, by the processing device of the processing server, the consumer digital signature using the consumer public key. In some embodiments, the blockchain data value may further include a consumer public key, and the method 400 may further include generating, by the processing device of the processing server, a consumer blockchain address using the consumer public key, wherein the transmission to the node in the blockchain network further includes the consumer blockchain address.

In one embodiment, the merchant digital signature may be accompanied by a merchant public key, and the merchant public key may be included in the transmission to the node in the blockchain network. In a further embodiment, the method 400 may further include verifying, by the processing device of the processing server, the merchant digital signature using the merchant public key. In some embodiments, the dispute resolution process may further include exchanging data messages between the first computing device and the second computing device related to the blockchain data value.

In one embodiment, the method 400 may also include: storing, in a memory (e.g., the memory 226) of the processing server, a cryptographic key pair comprised of a server private key and a server public key; generating, by the processing device of the processing server, a server digital signature using the server private key and a server blockchain address using the server public key; and transmitting, by the transmitter of the processing server, at least the server digital signature and the currency amount to a node in the blockchain network associated with the blockchain, wherein the transmission of at least the merchant digital signature and the currency amount to a node in the blockchain network further includes the server blockchain address. In a further embodiment, transmission of at least the server digital signature and the currency amount to a node in the blockchain network may further include a consumer blockchain address.

Computer System Architecture

Figure 5:
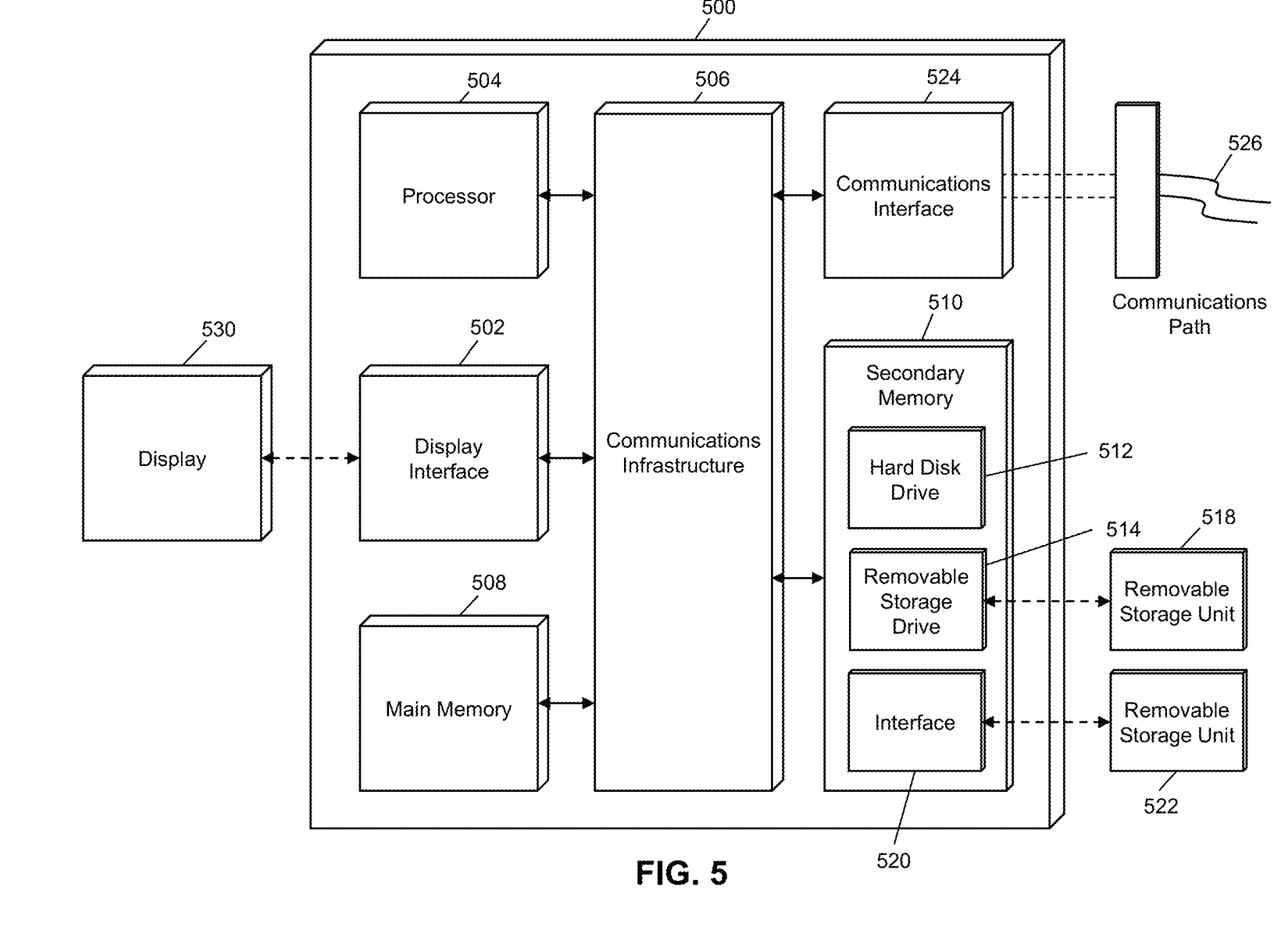
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for dispute resolution for a blockchain transaction. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for reversal of a blockchain transaction, comprising:
    receiving, by a receiver of a processing server, a request for reversal of a blockchain transaction, the request including a blockchain transaction identifier identifying the blockchain transaction on a blockchain and a reason code from a first computing device of a blockchain network;
    transmitting, by the receiver of a processing server, the blockchain transaction identifier and the reason code to a processing device of the processing server;
    receiving, by the processing device of the processing server, the transmitted blockchain transaction identifier and the reason code from the receiver;
    identifying, by the processing device of the processing server, the blockchain transaction and a merchant blockchain address, within a blockchain data value of the blockchain based on the received blockchain transaction identifier;
    determining, by the processing device of the processing server, if the blockchain transaction is eligible for reversal;
    in response to determining the blockchain transaction is eligible for reversal:
        receiving, by the receiver of the processing server, a merchant digital signature from a second computing device associated with the merchant blockchain address;
        transmitting, by the receiver of the processing server, the received merchant digital signature to the processing device of the processing server;
        transmitting, by the processing device of the processing server, the merchant digital signature and a currency amount of the blockchain transaction to a transmitter of the processing server;
        receiving, by the transmitter of the processing device, the merchant digital signature and the currency amount; and
        transmitting, by the transmitter of the processing server, at least the merchant digital signature and the currency amount to a node in the blockchain network.

2. The method of claim 1, wherein the determining, by the processing device of the processing server, the blockchain transaction is eligible for reversal includes:
    receiving, by the processing device of the processing server, evidence regarding the request for reversal from the first computing device; and
    determining, by the processing device of the processing server, the request for reversal is valid based on the evidence.

3. The method of claim 1, further comprising:
    in response to determining the blockchain transaction is not eligible for reversal:
        determining, by the processing device of the processing server, the blockchain transaction is valid, wherein the determination the blockchain transaction is valid includes:
            receiving, by the processing device of the processing server, evidence regarding the request for reversal from the first computing device;
            determining, by the processing device of the processing server, the request for reversal is invalid based on the evidence; and
            generating, by the processing device of the processing server, a record of the invalid request for reversal from the first computing device.

4. The method of claim 1, wherein receipt of the request for reversal triggers the execution of a smart contract on the blockchain, the smart contract initiating an escrow blockchain transaction holding the currency amount in escrow.

5. The method of claim 1, further comprising:
    storing, by the processing device of the processing server, in a database a record of reversal requests; and
    wherein the determining the request for reversal received from the first computing device is eligible for reversal includes:
        identifying, by the processing device of the processing server, one or more reversal requests in the database associated with the first computing system and/or the second computing system.

6. The method of claim 1, further comprising:
    receiving, by the receiver of the processing server, a consumer digital signature, the consumer digital signature received as part of the request for reversal;
    identifying, by the processing device of the processing server, a consumer public key within the blockchain data value of the blockchain; and
    verifying, by the processing device of the processing server, the consumer digital signature using the consumer public key.

7. The method of claim 1, further comprising:
    identifying, by the processing device of the processing server, a consumer public key within the blockchain data value of the blockchain;
    generating, by the processing device of the processing server, a consumer blockchain address using the consumer public key; and
    transmitting, by the transmitter of the processing server, the consumer blockchain address to the node in the blockchain network.

8. The method of claim 1, further comprising:
    receiving, by the receiver of the processing server, a merchant public key;
    verifying, by the processing device of the processing server, the merchant digital signature using the merchant public key; and
    transmitting, by the transmitter of the processing device, the merchant public key-to the node in the blockchain network.

9. The method of claim 1, wherein the determining, by the processing device of the processing server, the blockchain transaction is eligible for reversal includes:
    applying, by the processing device of the processing server, one or more reversal rules to the blockchain transaction.

10. The method of claim 1, wherein the determining, by the processing device of the processing server, the blockchain transaction is eligible for reversal further includes exchanging data messages between the first computing device and the second computing device of the blockchain network.

11. A system for reversal of a blockchain transaction, comprising:
    a processing server;
    a non-transitory memory containing instructions when executed by the processing server causes the processing server to perform the steps of:

receiving, by a receiver of the processing server, request for reversal of a blockchain transaction, the request including a blockchain transaction identifier identifying the blockchain transaction on a blockchain and a reason code from a first computing device of a blockchain network;

transmitting, by the receiver of a processing server, the blockchain transaction identifier and the reason code to a processing device of the processing server;

receiving, by the processing device of the processing server, the transmitted blockchain transaction identifier and the reason code from the receiver;

identifying, by the processing device of the processing server, the blockchain transaction and a merchant blockchain address within a blockchain data value of the blockchain based on the received blockchain transaction identifier;

determining, by the processing device of the processing server, if the blockchain transaction is eligible for reversal;

in response to determining the blockchain transaction is eligible for reversal:

receiving, by the receiver of the processing server, a merchant digital signature from a second computing device associated with the merchant blockchain address;

transmitting, by the receiver of the processing server, the received merchant digital signature to the processing device of the processing server;

transmitting, by the processing device of the processing server, the merchant digital signature and a currency amount of the blockchain transaction to a transmitter of the processing server;

receiving, by the transmitter of the processing device, the merchant digital signature and the currency amount; and transmitting, by the transmitter of the processing server, at least the merchant digital signature and the currency amount to a node in the blockchain network.

12. The system of claim 11, wherein the determining, by the processing device of the processing server, the blockchain transaction is eligible for reversal includes:

receiving, by the processing device of the processing server, evidence regarding the request for reversal from the first computing device; and determining, by the processing device of the processing server, the request for reversal is valid based on the evidence.

13. The system of claim 11, further includes performing the steps of:

in response to determining the blockchain transaction is not eligible for reversal:

determining, by the processing device of the processing server, the blockchain transaction is valid, wherein the determination the blockchain transaction is valid includes:

receiving, by the processing device of the processing server, evidence regarding the request for reversal from the first computing device;

determining, by the processing device of the processing server, the request for reversal is invalid based on the evidence; and generating, by the processing device of the processing server, a record of the invalid request for reversal from the first computing device.

14. The system of claim 11, wherein receipt of the request for reversal triggers the execution of a smart contract on the blockchain, the smart contract initiating an escrow blockchain transaction holding the currency amount in escrow.

15. The system of claim 11, further includes performing the steps of:

storing, by the processing device of the processing server, in a database a record of reversal requests; and wherein the determining the request for reversal received from the first computing device is eligible for reversal includes includes:

identifying, by the processing device of the processing server, one or more reversal requests in the database associated with the first computing system and/or the second computing system.

16. The system of claim 11, further includes performing the steps of:

receiving, by the receiver of the processing server, a consumer digital signature, the consumer digital signature received as part of the request for reversal;

identifying, by the processing device of the processing server, a consumer public key within the blockchain data value of the blockchain; and verifying, by the processing device of the processing server, the consumer digital signature using the consumer public key.

17. The system of claim 11, further includes performing the steps of:

identifying, by the processing device of the processing server, a consumer public key within the blockchain data value of the blockchain;

generating, by the processing device of the processing server a consumer blockchain address using the consumer public key; and transmitting, by the transmitter of the processing server, the consumer blockchain address to the node in the blockchain network.

18. The system of claim 11, further includes performing the steps of:

receiving, by the receiver of the processing server, a merchant public key;

verifying, by the processing device of the processing server, the merchant digital signature using the merchant public key and transmitting, by the transmitter of the processing device, the merchant public key-to the node in the blockchain network.

19. The system of claim 18, wherein the determining, by the processing device of the processing server, the blockchain transaction is eligible for reversal includes:

applying, by the processing device of the processing server, one or more reversal rules to the blockchain transaction.

20. The system of claim 11, wherein the determining, by the processing device of the processing server, the blockchain transaction is eligible for reversal further includes exchanging data messages between the first computing device and the second computing device of the blockchain network.

* * * * *